United States Patent
Carlson

(10) Patent No.: US 10,952,372 B2
(45) Date of Patent: Mar. 23, 2021

(54) REGRESSIVE SUSPENSION SPRING SYSTEM

(71) Applicant: Blount, Inc., Portland, OR (US)

(72) Inventor: Jason Carlson, Bryon, IL (US)

(73) Assignee: OREGON TOOL, INC., Portland, OR (US)

( * ) Notice: Subject to any disclaimer, the term of this patent is extended or adjusted under 35 U.S.C. 154(b) by 46 days.

(21) Appl. No.: 16/381,681

(22) Filed: Apr. 11, 2019

(65) Prior Publication Data

US 2019/0313578 A1     Oct. 17, 2019

Related U.S. Application Data

(60) Provisional application No. 62/656,957, filed on Apr. 12, 2018.

(51) Int. Cl.
| | |
|---|---|
| *A01D 34/82* | (2006.01) |
| *A01D 34/74* | (2006.01) |
| *A01D 34/64* | (2006.01) |

(52) U.S. Cl.
CPC .............. *A01D 34/82* (2013.01); *A01D 34/74* (2013.01); *A01D 34/64* (2013.01)

(58) Field of Classification Search
CPC ........ A01D 34/82; A01D 34/74; A01D 34/64; A01D 34/66; A01D 75/182; A01D 34/661; A01D 89/004; B60G 2300/04; B60G 2204/124; B60G 2300/08; B60G 11/27
See application file for complete search history.

(56) References Cited

U.S. PATENT DOCUMENTS

| | | | | |
|---|---|---|---|---|
| 2,502,309 A | * | 3/1950 | Byrd ...................... | B62D 61/12 |
| | | | | 280/43.23 |
| 2,981,344 A | * | 4/1961 | Roberson ............... | A01B 63/26 |
| | | | | 172/386 |
| 3,672,701 A | * | 6/1972 | Blank .................... | A01B 63/22 |
| | | | | 280/414.5 |

(Continued)

FOREIGN PATENT DOCUMENTS

| | | |
|---|---|---|
| DE | 19549336 A1 | 11/1996 |
| EP | 1405553 A1 | 4/2004 |

(Continued)

OTHER PUBLICATIONS

Renton Coil Spring; Regressive Spring Assembly; retrieved from: http://riderasmussenstyle.com/wp-content/uploads/2015/10/Regressive-Spring-Presentation.pdf.

*Primary Examiner* — Arpad Fabian-Kovacs
(74) *Attorney, Agent, or Firm* — Schwabe, Williamson & Wyatt, P.C.

(57) ABSTRACT

A regressive suspension spring system for a farm implement including a spring arm, a rocker arm, a wheel arm rotatably coupled to the farm implement at a first end and rotatably coupled to the rocker arm at a second end at a first pivot, one or more dogbone links rotatably coupled to the spring arm at a first end of the one or more dogbone links at a second pivot and rotatably coupled to the rocker arm at a second end of the one or more dogbone links at a third pivot; and a spring disposed between the rocker arm and the spring arm. An attachable farm implement including a regressive suspension spring system, such as a rotary cutter. A powered machine including a regressive suspension spring system.

13 Claims, 5 Drawing Sheets

(56) References Cited

U.S. PATENT DOCUMENTS

| | | | |
|---|---|---|---|
| 3,870,107 A * | 3/1975 | Orthman | A01B 63/22 172/413 |
| 4,178,005 A * | 12/1979 | Kent, Jr. | B60B 33/04 172/417 |
| 4,934,733 A | 6/1990 | Smith et al. | |
| 4,948,162 A | 8/1990 | McCanse | |
| 5,988,293 A * | 11/1999 | Brueggen | A01B 63/22 172/413 |
| 6,055,800 A | 5/2000 | Walch | |
| 6,170,242 B1 | 1/2001 | Gordon | |
| 6,205,754 B1 | 3/2001 | Laskowski | |
| 6,401,832 B1 * | 6/2002 | Payne | A01B 63/22 172/238 |
| 6,497,086 B2 | 12/2002 | Bergsten et al. | |
| 6,594,980 B2 | 7/2003 | Oka et al. | |
| 6,655,118 B1 | 12/2003 | Thompson et al. | |
| 6,679,339 B1 * | 1/2004 | Steinlage | A01B 63/22 172/395 |
| 6,912,832 B1 | 7/2005 | Thompson et al. | |
| 7,726,111 B2 | 6/2010 | Grywacheski et al. | |
| 8,209,946 B2 * | 7/2012 | Neudorf | A01D 34/661 56/15.2 |
| 8,511,049 B2 | 8/2013 | Thompson et al. | |
| 8,893,816 B2 * | 11/2014 | Maro | A01B 63/22 172/311 |
| 2002/0108363 A1 | 8/2002 | Bergsten et al. | |
| 2003/0005677 A1 | 1/2003 | Oka et al. | |
| 2010/0319311 A1 | 12/2010 | McCurdy et al. | |
| 2011/0197419 A1 | 8/2011 | Melone et al. | |
| 2012/0286462 A1 | 11/2012 | Pepka | |
| 2016/0135354 A1 * | 5/2016 | Thorsell | A01D 34/16 56/255 |
| 2018/0160623 A1 * | 6/2018 | Welsh | A01D 34/736 |

FOREIGN PATENT DOCUMENTS

| | | |
|---|---|---|
| EP | 1731011 A1 | 12/2006 |
| NL | 9300382 A | 10/1994 |
| WO | 2010091469 A2 | 8/2010 |

* cited by examiner

US 10,952,372 B2

REGRESSIVE SUSPENSION SPRING SYSTEM

CROSS-REFERENCE TO RELATED APPLICATION

This application claims the priority benefit of the earlier filing date of U.S. Provisional Application No. 62/656,957, filed Apr. 12, 2018, which is hereby incorporated herein by reference in its entirety.

TECHNICAL FIELD

Embodiments herein relate to the field of agricultural implements, and, more specifically, to a spring actuated suspension system for a farm implement, such as a rotary cutter.

BACKGROUND

Powered equipment is used by those who live in agricultural or rural areas to keep the weeds, brush, and high-growing grasses under control. For larger areas, vehicle driven rotary cutters, are a preferred machine for this task. Because the ground where these rotary cutters are used is typically not entirely flat, many rotary cutters use trailing wheels to keep the blades of the cutter at a selected height. However, one of the problems encountered with the trailing wheels is the transmission of shock from the rough or uneven surface to the body of the rotary cutter and the wear and tear it causes. To deal with this problem spring systems have been developed that absorb some of the shock. However, these systems are typically progressive in nature, meaning that the greater the load and/or displacement placed on the system, the more shock is transmitted to the cutter body. This is not ideal because as the load increases one may want more shock absorption, not less. These and other problems are overcome by the current disclosure.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
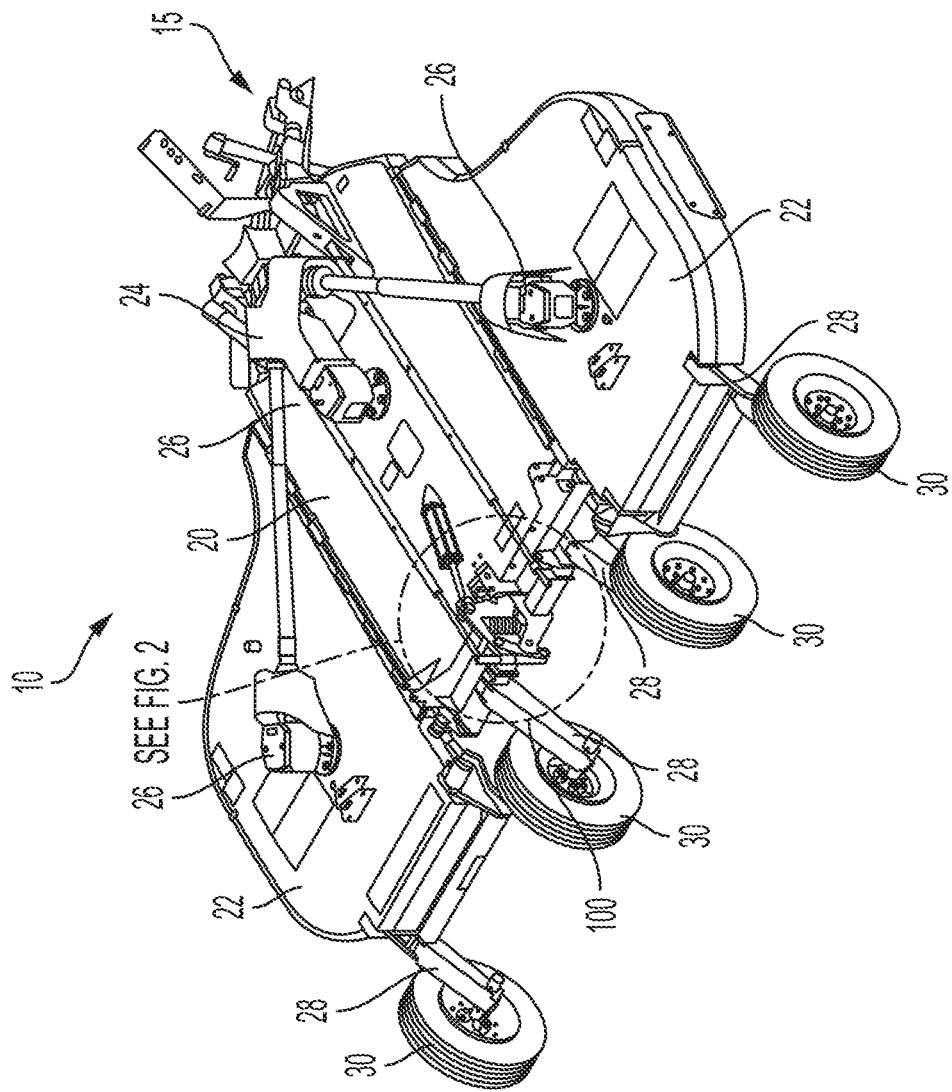
FIG. 1 shows a perspective view of a rotary cutter including a regressive suspension spring system for the rotary cutter, in accordance with embodiments herein.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

When a rotary cutter is traveling over rough ground, one of the objectives is to maintain a consistent and level cut. One of the ways that this is accomplished is with a suspension system. In addition to allowing the rotary cutter to maintain a consistent and level cut, the suspension system should be able to protect the rotary cutter from the jarring motion caused by abusive terrain. Thus, an adequate suspension system for a rotary cutter provides both protection of the machinery and consistency of operation.

Figure 5:
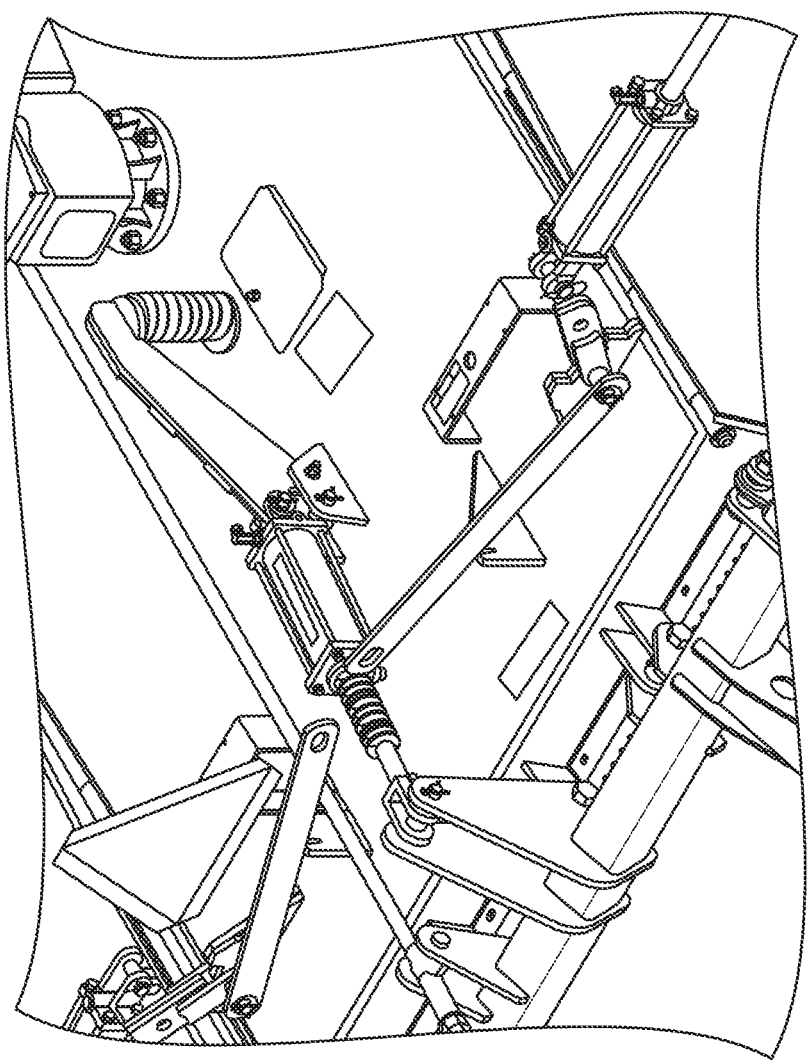
FIG. 5 shows a prior art spring actuated shock absorption system for a rotary cutter.

As shown in FIG. 5, in a typical suspension system, the force encountered as the rotary cutter travels over uneven ground is transferred through a hydraulic ram and a spring link to a spring coupled to the deck of the rotary cutter. While similar systems have been employed for years, and are generally considered better than employing no suspension system at all, there are several drawbacks. First and foremost is that this spring system is linear and progressive (adds spring resistance) as more and more force is applied. Thus, as the force from a bump increases, the system is less able to absorb it.

To overcome this and other problems, such as a cluttered deck, the inventor has designed a novel suspension system that is more regressive in spring rate. It was determined that an ideal system would be stiff during normal use and soften as the suspension travels through a compression stroke to absorb the energy of large obstacles. As a typical spring is compressed, the resistance to spring movement increases in a linear fashion with force and distance, see the dashed line in FIG. 4. With the addition of typical spring arms that add leverage to the spring, the effective system spring rate increases in a progressive manner such that the effective system spring rate increases in stiffness faster than the distance the spring compresses (see, for example, the system shown in FIG. 5).

Figure 4:
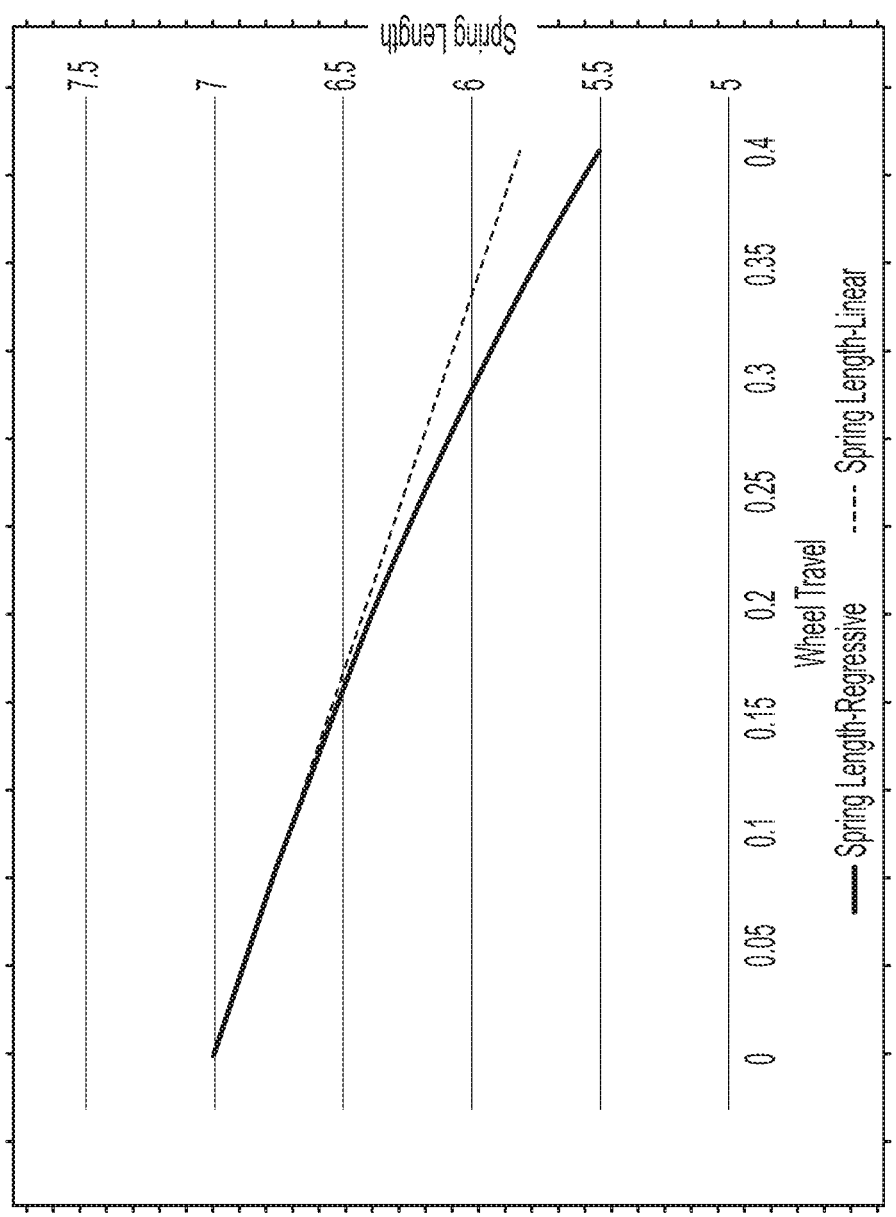
FIG. 4 is a graph demonstrating the difference between a regressive suspension spring system rate and a linear spring rate, according to embodiments herein.

With the design concept disclosed herein, a rocker arm and rocker link work with the spring to provide a more regressive spring rate (or less progressive) that reduces the impact of the natural increase in spring rate as the spring is compressed, (see the solid line in FIG. 4). As disclosed herein, this regressive suspension spring system is able to provide a stiff and stable mowing experience while providing a means to soften the impact of large loads. This system has been successfully implemented on a rotary cutter. By using a system of rocker arm and rocker links, the disclosed system was able to control the suspension rate as the spring compresses thereby providing an optimized suspension design for an agriculture field attachment. Furthermore, this system also simplifies the design and provides a cleaner machine with less clutter by moving the components of the suspension to the wheel arm. For the purposes of the present disclosure the term "regressive" refers to system in which the spring rate does not increase as fast as a 'typical' progressive spring system. The curve in the solid line shown in FIG. 4 demonstrates that the disclosed regressive suspension spring system exhibits regressive behavior as a function of wheel travel, as evidenced by the reduction in spring length is a function of wheel travel.

Thus, disclosed is a regressive suspension spring system for a farm implement. The system includes: a spring arm; a rocker arm; a wheel arm rotatably coupled to the farm implement at a first end and rotatably coupled to the rocker arm at a second end at a first pivot; one or more dogbone links rotatably coupled to the spring arm at a first end of the one or more dogbone links at a second pivot and rotatably coupled to the rocker arm at a second end of the one or more dogbone links at a third pivot; and a spring disposed between the rocker arm and the spring arm. In embodiments, the regressive suspension spring system may further include a hydraulic ram coupled at first end to the spring arm and at a second end to the farm implement. In embodiments, the spring is coupled to a first end of the rocker arm and the one or more dogbone links are coupled to a second end of the rocker arm. In embodiments, the first pivot is disposed between the first end of the rocker arm and the second end of the rocker arm. In embodiments, the regressive suspension spring system may further include wheels coupled to the wheel arm. In embodiments, the wheels are coupled to the wheel arm by trailing arms. Springs for use in the disclosed systems include coiled compression springs, leaf springs, torsion springs, one or more torsion bars, disc springs, and/or clock springs. The spring can be a linear spring, for example having a linear compression profile. Alternatively, the spring can be non-liner, for example having a non-linear compression profile. The spring may also be a composite spring, for example composed of two or more springs, which can have the same or different spring rates.

Also disclosed is an attachable farm implement that includes a regressive suspension spring system. In embodiments, the attachable farm implement reversibly couples to a vehicle. In embodiments, the attachable farm implement is rotary cutter. In embodiments, the rotary cutter includes a central rotary blade housing section flanked on either side by two lateral rotary blade housing sections.

Also disclosed is a powered machine that includes a regressive suspension spring system. In embodiments, the powered machine is a rotary cutter.

FIG. 1 shows a powered rotary cutter attachment 10 with an exemplary regressive suspension spring system 100, according to embodiments herein. The powered rotary cutter attachment 10 includes a central rotary blade housing section 20 flanked on either side by two lateral rotary blade housing sections 22. The powered rotary cutter attachment 10 couples to a vehicle, such as a tractor, at clevis hitch 15. The powered rotary cutter attachment 10 may be powered by a standard power take off shaft, or alternatively, by a hydraulics. The power to drive the cutter blades is transmitted from a central transmission 24 to the drive heads 26. Coupled to the trailing end of the powered rotary cutter attachment 10 by trailing arms 28 are wheels 30, which can be raised or lowered to set the cutter height in conjunction with the self-leveling tongue with a clevis hitch 15. As shown in more detail in FIG. 2 a hydraulic ram, or alternatively a linear actuator, can be used to set the height of the wheels 30.

Figure 2:
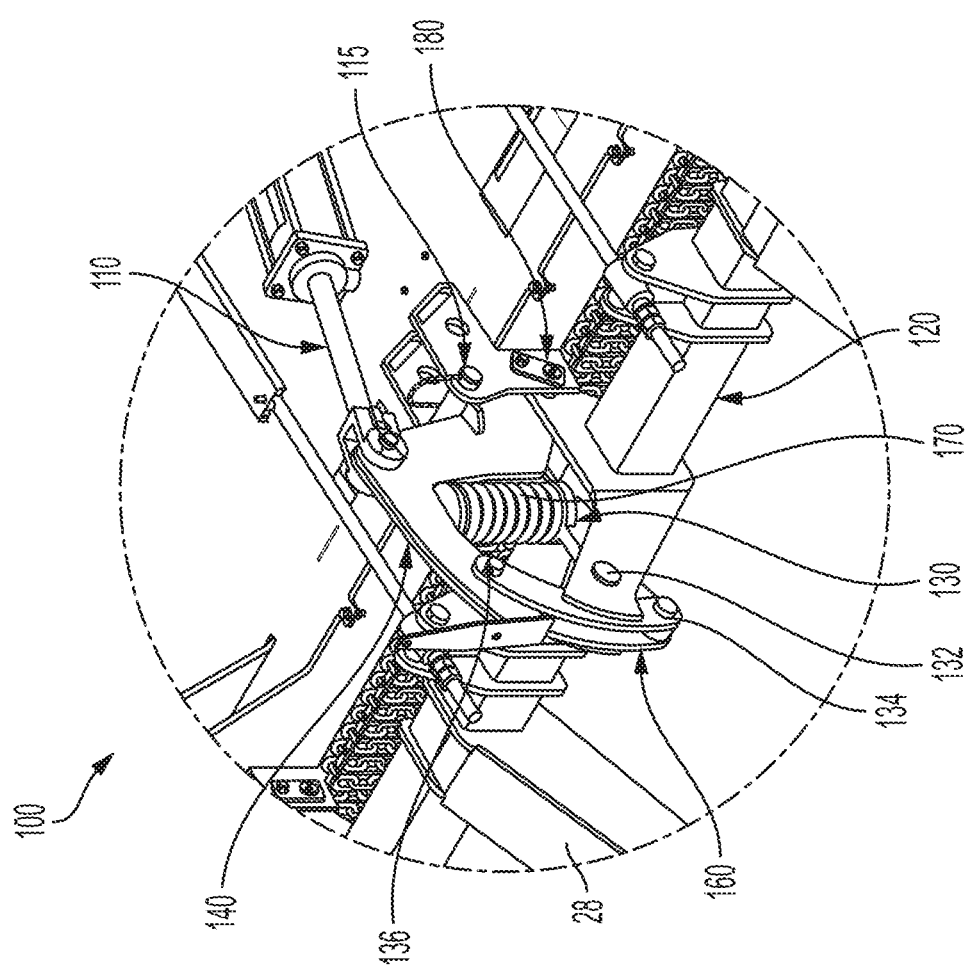
FIG. 2 shows a close-up perspective view of a rotary cutter including a regressive suspension spring system for the rotary cutter, in accordance with embodiments herein.

FIG. 2 shows a close-up view of a regressive suspension spring system 100, according to embodiments herein. The regressive suspension spring system 100 includes a hydraulic ram 110 that can be actuated to raise and/or lower the trailing arms 28 and their attendant wheels. Travel of the wheel arm can be locked out with a travel lock pin 115. When the hydraulic ram 110 is actuated a wheel arm 120 and spring arm 140 rotates about a pivot pin 180. The hydraulic ram 110 has one end fixed to the deck and is thus grounded and one end fixed to a spring arm 140, thus grounding the spring arm 140 from moving when the wheels are in a deployed position. The spring arm 140 pivots freely from the wheel arm 120. Thus, the wheel arm 120 pivots about the pivot pin 180, but the spring arm 140 only pivots about the pivot pin 180 when the length of the hydraulic ram 110 is changed. The regressive suspension spring system 100 further includes a rocker arm 130 that connects to the wheel arm 120 at a first pivot 132. The suspension spring system 100 also includes dogbone links 160 that are connected at one end to rocker arm 130 at a second pivot point 134 and at the other end to the spring arm 140 at a third pivot point 136. A spring 170 is coupled at either end to the spring arm 140 and the rocker arm 130, respectively. As the wheel arm 120 pivots, the wheel arm 120 moves the first pivot 132 that supports the rocker arm 130 and the dogbone links 160, thus compressing the spring 170. The ratio of the rocker arm 130, dogbone links 160 and the wheel arm 120 pivot pin 180 is what controls the rate of spring compression (see FIG. 4). Thus, as the wheel arm 120 moves in response to hitting bump, the wheel arm 120 moves the rocker arm 130 up as well. However, the dogbone links 160 contravene this movement by pushing the rocker arm 130 back down. Together the spring arm 140, the rocker arm 130, and the dogbone links 160 provide for the regressive nature of the response to wheel arm 120 encountering a rotational force from rough terrain.

Figure 3:
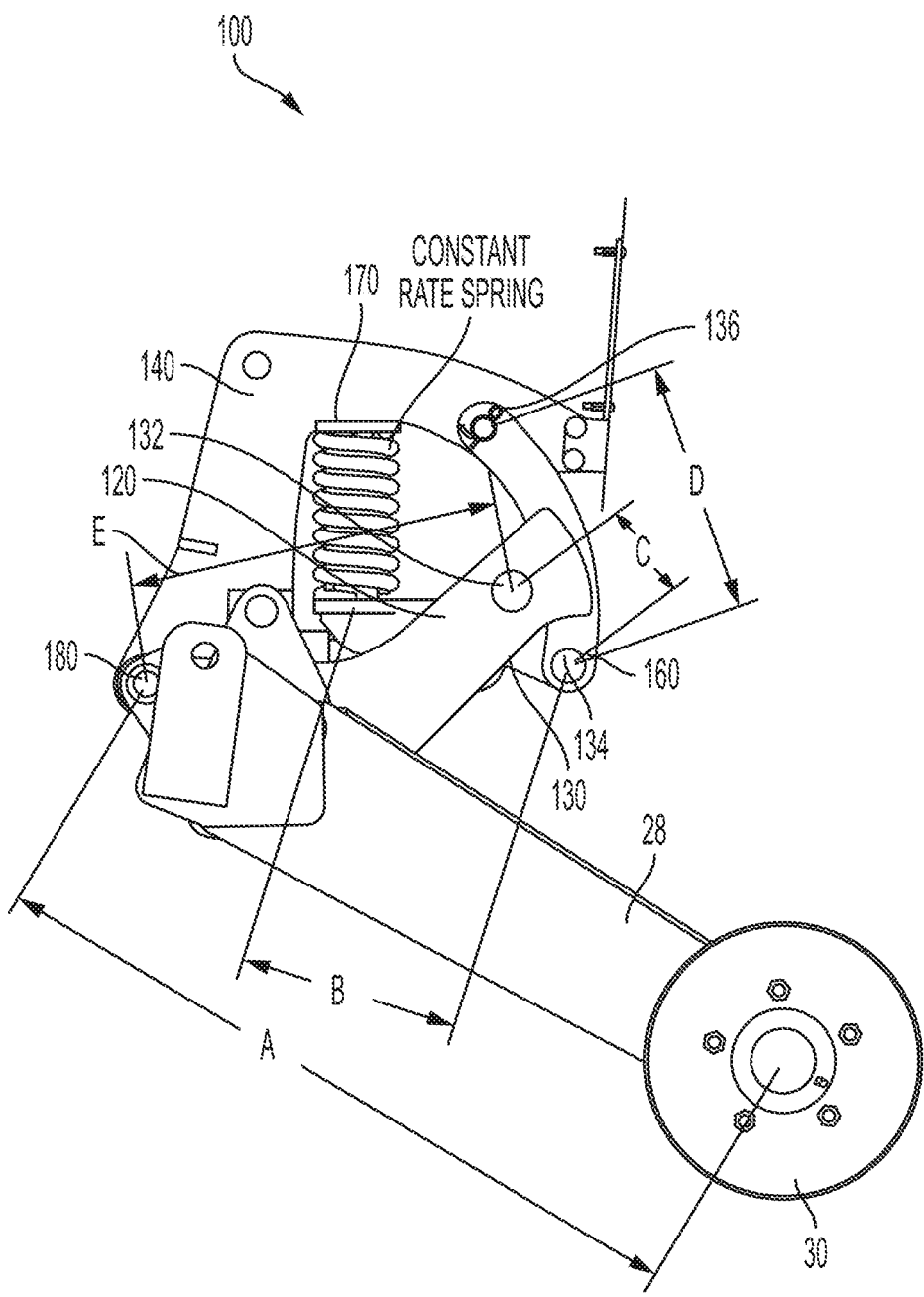
FIG. 3 shows side elevation a view of a regressive suspension spring system 100, according to embodiments herein.

FIG. 3 shows side elevation a view of a regressive suspension spring system 100 as shown in FIG. 2. The side elevation is particularly useful in showing several dimensions of the system that provide for its regressive nature. The distance between the wheel 30 center and the pivot pin 180 is distance A. The rocker arm connects at one end to the spring and at the other end to the dogbone links at pivot 134 the distance between the spring connection to the rocker arm and the pivot 134 is distance B. The rocker arm 130 further connects to the wheel arm 120 at a first pivot 132. The distance between the first pivot 132 and the second pivot point 134 is distance C. The dogbone links are connected at the other end to the spring arm at the third pivot point 136. The distance between the first pivot 132 and the second pivot point 134 is distance D. The distance between the first pivot 132 and the pivot pin 180 is distance E. As the wheel arm 120 pivots, the wheel arm 120 moves the first pivot 132 that supports the rocker arm 130 and the dogbone links 160, thus compressing the spring 170. The ratio of the rocker arm 130, dogbone links 160 and the wheel arm 120 pivot pin 180 is what controls the rate of spring compression. Varying any of the five distances A, B, C, D and E values will affect the ratio of effective spring rate to wheel travel distance. The smaller distances have a corresponding larger impact on the system as they are changed. In certain embodiments, the ratio of A:B:C:D:E is about 22-35:7.5-9.5:3-4.5:8-11.5:8.5-20.5, respectively.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A regressive suspension spring system for a farm implement, comprising:
   a spring arm;
   a rocker arm;
   a wheel arm rotatably coupled to the farm implement at a first end and rotatably coupled to the rocker arm at a second end at a first pivot;
   one or more dogbone links rotatably coupled to the spring arm at a first end of the one or more dogbone links at a second pivot and rotatably coupled to the rocker arm at a second end of the one or more dogbone links at a third pivot; and
   a spring disposed between the rocker arm and the spring arm,
   wherein the spring arm, rocker arm, wheel arm, and the one or more dogbone links are configured to cause the spring to be compressed at a regressive rate as the wheel arm is rotated.

2. The regressive suspension spring system of claim 1, further including a hydraulic ram coupled at first end to the spring arm and at a second end to the farm implement.

3. The regressive suspension spring system of claim 1, wherein the wheel arm rotatably pivots about a pivot pin.

4. The regressive suspension spring system of claim 1, wherein the spring is coupled to a first end of the rocker arm and the one or more dogbone links are coupled to a second end of the rocker arm, and wherein the first pivot is disposed between the first end of the first end of the rocker arm and the second end of the rocker arm.

5. The regressive suspension spring system of claim 1, further comprising wheels coupled to the wheel arm.

6. The regressive suspension spring system of claim 5, wherein the wheels are coupled to the wheel arm by trailing arms.

7. The regressive suspension spring system of claim 1, wherein the spring comprises a coiled compression spring, a leaf spring, a torsion spring, one or more torsion bars, a disc spring, or a clock spring.

8. An attachable farm implement comprising the regressive suspension spring system of claim 1.

9. The attachable farm implement of claim 8, wherein the attachable farm implement reversibly couples to a vehicle.

10. The attachable farm implement of claim 9, wherein the attachable farm implement is rotary cutter.

11. The attachable farm implement of claim 10, wherein the rotary cutter comprises a central rotary blade housing section flanked on either side by two lateral rotary blade housing sections.

12. A powered machine comprising the regressive suspension spring system of claim 1.

13. The powered machine of claim 12, wherein the powered machine is a rotary cutter.

* * * * *